United States Patent
Kieffel et al.

(10) Patent No.: US 11,554,341 B2
(45) Date of Patent: Jan. 17, 2023

(54) CIRCUIT BREAKER COMPRISING A METAL-ORGANIC FRAMEWORK MATERIAL FOR CO ADSORPTION

(71) Applicant: GENERAL ELECTRIC TECHNOLOGY GMBH, Baden (CH)

(72) Inventors: Yannick Kieffel, Villeurbanne (FR); Louis Maksoud, Villeurbanne (FR)

(73) Assignee: General Electric Technology GmbH, Baden (CH)

( * ) Notice: Subject to any disclaimer, the term of this patent is extended or adjusted under 35 U.S.C. 154(b) by 424 days.

(21) Appl. No.: 16/614,618

(22) PCT Filed: May 16, 2018

(86) PCT No.: PCT/EP2018/062755
§ 371 (c)(1),
(2) Date: Nov. 18, 2019

(87) PCT Pub. No.: WO2018/210938
PCT Pub. Date: Nov. 22, 2018

(65) Prior Publication Data
US 2020/0179864 A1    Jun. 11, 2020

(30) Foreign Application Priority Data

May 18, 2017   (EP) ..................................... 17290064

(51) Int. Cl.
*H01H 33/56*   (2006.01)
*H01H 33/70*   (2006.01)
*H02B 13/00*   (2006.01)
*B01D 53/02*   (2006.01)

(52) U.S. Cl.
CPC ............. *B01D 53/02* (2013.01); *H01H 33/56* (2013.01); *H01H 33/7076* (2013.01); *H02B 13/00* (2013.01); *B01D 2253/204* (2013.01); *B01D 2253/304* (2013.01); *B01D 2257/502* (2013.01); *H01H 2033/566* (2013.01)

(58) Field of Classification Search
CPC .... H01H 33/56; H01H 33/7076; H01H 33/22; H01H 33/57; H01H 2033/566; H02B 13/00; H02B 13/055; B01D 53/02; B01D 2253/204; B01D 2253/304; B01J 20/226
USPC ........ 218/50, 13, 35, 51, 53, 57, 61, 63, 97, 218/114, 59
See application file for complete search history.

(56) References Cited

U.S. PATENT DOCUMENTS

| | | | |
|---|---|---|---|
| 8,304,676 B2* | 11/2012 | Uchii ...................... | H01H 33/56 218/85 |
| 8,674,253 B2* | 3/2014 | Uchii ................... | H01H 33/905 218/63 |
| 8,822,870 B2* | 9/2014 | Mantilla ................. | H01H 33/22 218/118 |
| 2008/0227634 A1 | 9/2008 | Muller et al. | |
| 2012/0031268 A1 | 2/2012 | Yaghi et al. | |
| 2014/0061540 A1* | 3/2014 | Long .................... | B01J 20/3425 423/247 |
| 2014/0263187 A1* | 9/2014 | Yamada ............... | H01H 33/765 218/63 |
| 2015/0206621 A1* | 7/2015 | Mahdizadeh ............ | H01B 3/40 521/97 |
| 2015/0228375 A1* | 8/2015 | Kieffel ................. | H02B 13/055 252/571 |
| 2016/0250618 A1 | 9/2016 | Long et al. | |

FOREIGN PATENT DOCUMENTS

| | | |
|---|---|---|
| EP | 2445068 A1 | 4/2012 |
| JP | 2014-124053 A | 7/2014 |
| JP | 2015-060682 A | 3/2015 |
| JP | 2015-073348 A | 4/2015 |
| JP | 2015073348 A | 4/2015 |
| KR | 10-2013-0013593 B1 | 1/1995 |
| KR | 10-2013-0128434 | 11/2013 |
| WO | 2012/122233 A2 | 9/2012 |

OTHER PUBLICATIONS

Translation of JP2015073348 (Original document published Apr. 16, 2015) (Year: 2015).*
International Search Report of PCT/EP2018/062755 dated Aug. 10, 2018.
European Search Report for Application No. 17290064.9 dated Dec. 5, 2017.
Won et al.: Adsorptive Removal of Hazardous Organics from Water with Metal-organic Frameworks. Appl. Chem. Eng., vol. 27, No. 4, Aug. 2016, 358-365, http://dx.doi.org/10.14478/ace.2016.1048.

* cited by examiner

*Primary Examiner* — William A Bolton
(74) *Attorney, Agent, or Firm* — Eversheds Sutherland (US) LLP

(57) ABSTRACT

Embodiments of the disclosure can include a circuit breaker, comprising an enclosure comprising: arcing contacts movable axially relative to each other, between an open position of the circuit breaker in which the arcing contacts are separated from each other and a closed position of the circuit breaker in which the arcing contacts are in contact with each other; and a gas inlet configured to blow an arc-control gas to interrupt an electric arc during movement of the arcing contacts from the closed position to the open position, wherein the arc-control gas comprises at least 80% of carbon dioxide; wherein the enclosure further comprises an adsorbing material, which adsorbs carbon monoxide after ionization of the carbon dioxide during arcing, said adsorber being a metal-organic framework comprising nickel and/or iron.

17 Claims, No Drawings

CIRCUIT BREAKER COMPRISING A METAL-ORGANIC FRAMEWORK MATERIAL FOR CO ADSORPTION

CROSS-REFERENCE TO RELATED APPLICATIONS

This application is a U.S. National Stage Application under 35 U.S.C. 371 and claims the priority benefit of International Application No. PCT/EP2018/062755 filed May 16, 2018, which claims priority to EP17290064.9, filed May 18, 2017, which are both incorporated herein by reference.

TECHNICAL FIELD AND PRIOR ART

The present invention relates to the field of electrical insulation and extinguishing of electrical arcs in medium- and high-voltage devices.

More precisely, it relates to a medium- or high-voltage circuit breaker comprising an adsorber, which adsorbs carbon monoxide that forms during arcing.

An arc-blast circuit breaker comprises at least two arcing contacts that are movable axially relative to each other, between an open position of the circuit breaker in which the arcing contacts are separated from each other and a closed position of the circuit breaker in which the arcing contacts are in contact with each other. In circuit breaker, current is typically broken by separating arcing contacts. From the closed position to the open position of the circuit breaker, an electric arc is likely to form between said contacts. In order to interrupt an electric arc, an insulating dielectric gas is blasted onto the arc, thereby making it possible to cool said arc and to extinguish it.

Currently, the most frequently-used arc-control gas for that type of circuit breakers is sulfur hexafluoride $SF_6$ because of the exceptional physical properties of said gas. However, $SF_6$ presents the major drawback of being a very powerful greenhouse gas, with a particularly high global warming potential (GWP).

Among the alternatives to the use of $SF_6$ as an arc-control gas, various gases of global warming potential that is lower than that of $SF_6$ are known, such as dry air or also nitrogen.

A particularly advantageous arc-control gas is carbon dioxide $CO_2$ because of its strong electric insulation and arc-extinction capabilities. Furthermore, $CO_2$ is non-toxic, non-flammable, with a very low GWP, and is also easy to obtain.

$CO_2$ can be used alone or in the form of a gas mixture, of which it constitutes the main gas referred to as "vector gas". For example, the gaseous medium, commonly marketed by Alstom under the name $g^3$ (or 'green gas for green'), a mixture of $CO_2$ (100-x) % with a fluorinated gas x % (×10%), is suitable for replacing $SF_6$. The gas mixture presents extinction capabilities that are comparable to, or even better than those of $SF_6$, has little or no effect on the environment (a global warming potential (GWP) 98% lower than the GWP of $SF_6$), a cost that is compatible with its use in manufacturing switchgear on an industrial scale and is non-toxic for humans and animals.

But, and contrary to the $SF_6$ which has the property of recombining after decomposition by arc discharge, $CO_2$ does not recombine completely and namely produces a significant amount of toxic gaseous carbon monoxide CO and carbon powder. Therefore, the neutralization of CO is a key issue. The neutralization of carbon monoxide can be performed in adsorbing (trapping) carbon monoxide on the surface of a substrate.

CO adsorption can be achieved with zeolite or with a Metal-Organic Framework (MOF) material.

The drawback of that first solution lies in the fact that a zeolite cannot sufficiently remove CO as the zeolite also adsorbs the insulating $CO_2$ gas.

MOFs are microporous solids, multidimensional structures of metallic atoms coordinated to organic ligands. They are structural materials with very high inner surface areas and ordered pore channels which make them highly attractive for gas-storage, especially for small gaseous molecules, such as $H_2$, $CH_4$. However, few existing MOFs in the market are proved to be selective to CO instead of $CO_2$.

In US 2012/0031268, gaseous contaminants, such as $SO_2$, $NH_3$, $Cl_2$, and CO have been captured with different MOFs: a $Zn_4O(CO_2)_6$ cluster linked by terephthalate, 2-aminoterephthalate, benzene-1,3,5-tris(4-benzoate), and diacetylene-1,4-bis-(4-benzoic acid); a $Cu_2(CO_2)_4$ cluster linked by trimesate; and 1D $Zn_2O_2(CO_2)_2$ chains linked by 2,5-dihydroxyterephthalate. However, the carbon monoxide breakthrough curves do not differ from that measured for a blank sample cell.

In document US 2008/0227634, it is mentioned that a MOF compound combined with a polymer can be used to adsorb a gas such as carbon monoxide. The framework material comprises at least one bidentate organic compound bound by coordination to at least one metal ion. The pores of the material comprise a polymer which is suitable for adsorbing the gas, so that the material has improved properties in the storage and also separation of gases.

In the document US 2016/0250618, it is indicated that a MOF comprising oxide and/or carboxylate linking clusters of 4,6-dioxido-1,3-benzenedicarboxylate based linking moieties, is suitable for storing and/or separating gas molecules such as gases including ammonia, argon, carbon dioxide, carbon monoxide, hydrogen, and methane.

These documents overall focus on the synthesis of the MOFs and the implicated ligands. Among them, there is no investigation of MOFs for selective adsorption of CO in $CO_2$ in the operation conditions of a medium- or high-voltage circuit breaker (i.e. at temperature lower than 105° C.).

SUMMARY OF THE INVENTION

The invention aims to propose a circuit breaker comprising a material adsorbing selectively CO gas in a gas mixture formed mainly with $CO_2$, at low temperature (below around 100° C.).

The material shall be inert to all the other components of the gas, with a feasible cost and with a good selectivity to CO compared to the other components.

These objects are achieved by the invention that provides a circuit breaker, comprising an enclosure comprising:
- at least two arcing contacts that are movable axially relative to each other, between an open position of the circuit breaker in which the arcing contacts are separated from each other and a closed position of the circuit breaker in which the arcing contacts are in contact with each other,
- a gas inlet configured to blow an arc-control gas in order to interrupt an electric arc that is likely to form during movement of the arcing contacts from the closed position to the open position of the circuit breaker, the arc-control gas comprises at least 80% of carbon dioxide, the enclosure further comprises an adsorbing material, which adsorbs carbon monoxide that forms after ionization of the carbon dioxide during arcing, said adsorbent being a metal-organic framework comprising nickel and/or iron.

A metal organic framework (MOF) is composed of two components: a metal ion or a cluster of metal ions that is linked to at least an organic ligand. The MOF can comprise several ligands to form two dimensional or three dimensional structures. The choice of metal and ligand has significant effects on the structure (porosity, size) and properties of the MOF. The inventors have highlighted that a MOF with nickel and/or iron presents remarkable adsorbing properties in the operation conditions of a medium- or high-voltage circuit breaker.

This material enables the neutralization of carbon monoxide even at low temperature (below 200° C., and preferably below 105° C.).

It selectively adsorbs and retains carbon monoxide instead of carbon dioxide. The fluorinated compounds are not adsorbed onto the materials.

There is no need to add an adsorbing polymer as described in the prior art.

The successful purification of the insulating gas maintains its properties and improves its longevity.

Additionally, this material is suitable for fitting in a circuit breaker without any increase in its bulk and without any noticeable increase in costs, namely in terms of manufacturing process.

Advantageously, the metal organic framework is in the form of particles. This enables to increase the surface area.

Advantageously, the particles have a diameter from 1 mm to 10 mm, preferably from 1 mm to 5 mm. It is relatively easy to obtain such size of particles by conventional and low-cost methods.

According to another embodiment, the adsorbing material is supported by a ceramic substrate, such as a cordierite substrate or an aluminosilicate substrate. Ceramic substrates have a high thermal resistance, which is suitable for circuit breaker applications.

Advantageously, the arc-control gas is constituted by carbon dioxide $CO_2$. In a second variant of the invention, the arc-control gas is a gas mixture comprising $CO_2$ and at least a fluorinated compound, such as 2,3,3,3-tetrafluoro-2-(trifluoromethyl)-2-propanenitrile or 1,1,1,3,4,4,4-heptafluoro-3-(trifluoromethyl)-2-butanone, 2,3,3,3-Tetrafluoropropene, 1,3,3,3-Tetrafluoropropene or fluorooxirane.

The adsorbing material can be used to neutralize carbon monoxide in different arc-control gases.

The invention also provides an air-insulated switchgear (AIS) comprising a circuit breaker as defined previously.

The invention also provides a gas-insulated switchgear (GIS) comprising a circuit breaker as defined previously.

The invention can be better understood on reading the additional description given below that relates to a circuit breaker according to the invention.

Naturally, however, this additional description is given merely by way of illustrative example of the invention and is in no way limiting on said invention.

DETAILED DESCRIPTION OF PARTICULAR EMBODIMENTS

The circuit breaker is a medium- or high-voltage circuit breaker Above and below, the terms "medium voltage" and "high voltage" are used in the conventionally accepted manner, i.e. the term "medium voltage" refers to a voltage that is in the range 7.2 kV to 52 kV, whereas the term "high voltage" refers to a voltage that is in the range 52 kV to 800 kV.

The circuit breaker includes a closed enclosure having a certain number of electrical and/or mechanical components that are housed inside said enclosure. The enclosure is a leak-tight enclosure.

The volume of the enclosure can be from 50 L to 1000 L.

The enclosure comprises a gas inlet that is configured to blow the arc-control gas on the electric arc to extinguish it. The gas can be injected in a nozzle. The enclosure also contains a gas outlet.

The adsorbing material is disposed so as to be in contact with the gas flow containing the CO molecules. It can be located close to the arcing contacts.

According to another embodiment, it is located in the gas outlet of the circuit breaker The arc-control gas in the circuit breaker is a dielectric insulating gas.

It contains at least 80% by volume, and preferably, at least 90% by volume of carbon dioxide. For example, it can be a mixture of carbon dioxide (80-100%) and one or more fluorinated compounds (0-20%). Preferably, it is a mixture of carbon dioxide (90-97, preferably 90-96%) and one or more fluorinated compounds (3-10%, preferably 4-10%). For illustrative purpose, the fluorinated compound can be a compound commercialized by Alstom under the name Novec 4710 (2,3,3,3-tetrafluoro-2-(trifluoromethyl)-2-propanenitrile of formula $(CF_3)_2CFCN$) or Novec 5110 (1,1,1,3,4,4,4-heptafluoro-3-(trifluoromethyl)-2-butanone of formula $CF_3C(O)CF(CF_3)_2$). It can also be 2,3,3,3-Tetrafluoropropene (HFO-1234yf), 1,3,3,3-Tetrafluoropropene (HFO-1234ze) or fluorooxirane.

Two fluorinated compounds, such as heptafluoroisobutyronitrile and tetrafluoromethane, could also be used in association.

It should be noted that the adsorbing material could be used for gases with lower $CO_2$ amount. As long as there is $CO_2$ in the gas mixture, CO can be formed due to arcing in high-voltage circuit breaker.

According to a further embodiment the gas mixture comprises oxygen. The oxygen can further facilitate the reduction of harmful byproducts. For example, the gas mixture contains at least 80% of a mixture of carbon dioxide and oxygen. Wherein the oxygen content is preferably in the range of 1% to 25%.

In another embodiment, the gas could consist of carbon dioxide.

The arc-control gas is oxygen-free. By oxygen-free, it should be understood that the arc-control gas contains less than 0.1% by volume of oxygen gas, and preferably less than 0.02%.

Advantageously, the dielectric insulating gas is present in the equipment in entirely gaseous form whatever the utilization temperature of the equipment. It is therefore advisable for the pressure of the gas inside the equipment to be selected as a function of the saturated vapor pressure (SVP) presented by the gas at the lowest utilization temperature of said equipment.

During arcing, carbon dioxide is ionized into carbon monoxide. The amount of formed CO depends on the physical conditions of the operation and the chemical reaction involved in the process. It varies from few ppm up to few %, from example from 1 ppm to 5%.

Carbon monoxide neutralization is achieved using an adsorbing material. The adsorbing material is a MOF.

Every time an electric arc is extinguished and carbon monoxide is formed, the adsorbing material adsorbs it.

The performance and the application of a MOF depend on the metal and on the ligand. Selectivity can evolve between 10% (very low selectivity to CO) and 100% (exclusive adsorption of CO). In the present invention, the structure of MOFs has been modified in order to be selective to CO instead of $CO_2$ in the operation conditions of a medium- or high-voltage circuit breaker.

A MOF with iron and/or nickel presents adsorption selectivity to CO in a gas mixture comprises CO and $CO_2$ The tests consist in following during minutes/hours/days the evolution of the amount of CO (and $CO_2$) within an airtight test cell containing the sample (gas mixture) in contact with the MOF. Several MOFs materials of the invention have been successfully performed and tested using spectroscopy and gas chromatography.

The adsorbing material can be a powder of particles. The particles may a have a diameter of few millimeters, from example 1 mm to 10 mm, preferably from 1 mm to 5 mm.

The MOFs material of the present invention may be coated to the surface of any suitable substrates.

Advantageously, the substrate presents a high specific surface. For example, the substrate can be a substrate with a "honeycomb" or "monolithic" shape. The honey comb structure is also useful to trap the carbon powder.

The substrate can be a ceramic such as a cordierite substrate or an aluminosilicate substrate.

Alternatively, the neutralization material can be dispersed on a particulate support, such as pellets or particles or the like.

This kind of MOFs can be used in situ in medium- or high-voltage circuit breaker.

When an electric arc is formed, a portion of the fraction of $CO_2$, which is present in the gaseous state inside the enclosure, is broken down into molecular species of smaller molecular mass and, therefore, of smaller size than $CO_2$. This has the effect of raising the total pressure that exists inside the enclosure, while lowering the partial pressure of the $CO_2$ to below its SVP. The carbon monoxide molecules thus formed in this way are trapped by the adsorbing material, and this has the effect of returning the partial pressure of $CO_2$ to a value equal to its SVP.

The man skilled in the art will be able to select the appropriate amount of adsorbing material according to the volume of CO gas to be treated and the inner geometry of the involved enclosure of the circuit-breaker. For example, the amount of adsorbing material is calculated as function of the potential amount of CO formed within the circuit breaker after arcing simulated over the circuit breaker lifetime. It depends on the energy of arcing and so on the circuit breaker type. For illustrative purpose, maintenance can be expected every 20 years, during which the circuit breaker is opened and the adsorbing material may then be replaced by a new one if necessary.

The circuit breaker according to the invention has a compact structure. The concepts of the various embodiments described above can be effectively applied to various kinds of circuit breaker, such as for example circuit breakers with an interruption chamber of the axial- or transverse-blast type or of the mixed transverse-axial blast type.

For illustrative purposes, the circuit breaker can be used in any electrical device employing CO2 gas electric insulation, namely an electrical transformer, an electricity transporting or distributing line, a set of busbars, a switch, a connector/disconnector (also called switchgear), a unit combining a circuit breaker with fuses, a grounding switch, or a contactor.

The circuit breaker is particularly valuable for air-insulated switchgear (AIS) or gas-insulated switchgear (GIS), and more preferably for high-voltage AIS or GIS.

The invention claimed is:

1. A circuit breaker, comprising an enclosure comprising:
   at least two arcing contacts that are movable axially relative to each other, between an open position of the circuit breaker in which the arcing contacts are separated from each other and a closed position of the circuit breaker in which the arcing contacts are in contact with each other,
   an inlet configured to direct an arc-control gas to interrupt an electric arc during movement of the arcing contacts from the closed position to the open position of the circuit breaker, the arc-control gas comprises at least 80% of carbon dioxide and is substantially oxygen free,
   wherein the enclosure further comprises an adsorbing material, which adsorbs carbon monoxide that forms after ionization of the carbon dioxide during arcing, the adsorbing material being a metal-organic framework comprising nickel and/or iron.

2. The circuit breaker according to claim 1, wherein the metal organic framework is in a form of particles.

3. The circuit breaker according to claim 2, wherein the particles have a diameter from 1 mm to 10 mm.

4. The circuit breaker according to claim 3, wherein the particles have the diameter from 1 mm to 5 mm.

5. The circuit breaker according to claim 1, wherein the adsorbing material is supported by a ceramic substrate.

6. The circuit breaker according to claim 5, wherein the ceramic substrate is a cordierite substrate or an aluminosilicate substrate.

7. The circuit breaker according to claim 1, wherein the arc-control gas is constituted by carbon dioxide CO2.

8. The circuit breaker according to claim 1, wherein the arc-control gas is a gas mixture comprising CO2 and at least a fluorinated compound.

9. The circuit breaker according to claim 8, wherein the at least the fluorinated compound is chosen among 2,3,3,3-tetrafluoro-2-(trifluoromethyl)-2-propanenitrile, 1,1,1,3,4,4,4-heptafluoro-3-(trifluoromethyl)-2-butanone, 2,3,3,3-Tetrafluoropropene, 1,3,3,3-Tetrafluoropropene and fluorooxirane.

10. The circuit breaker according to claim 8, wherein the arc control gas comprises 90 to 97 percent carbon dioxide and 3 to 10 percent the at least the fluorinated compound.

11. An air-insulated switchgear comprising a circuit breaker as defined in claim 1.

12. A gas-insulated switchgear comprising a circuit breaker as defined in claim 1.

13. The circuit breaker according to claim 1, wherein the adsorbing material adsorb carbon monoxide at a temperature of less than 105 degrees Celsius.

14. The circuit breaker according to claim 1, wherein the arc-control gas comprises at least 90% of carbon dioxide.

15. The circuit breaker according to claim 1, wherein the absorbing material comprises iron and nickel.

16. The circuit breaker according to claim 1, wherein the metal-organic framework comprises a honeycomb structure.

17. The circuit breaker according to claim 1, wherein the adsorbing material does not adsorb fluorinated compounds.

* * * * *